(12) United States Patent
West

(10) Patent No.: US 10,917,944 B2
(45) Date of Patent: Feb. 9, 2021

(54) PORTABLE FOOD AND BEVERAGE HEATING DEVICE

(71) Applicant: Rennie R. West, Long Beach, CA (US)

(72) Inventor: Rennie R. West, Long Beach, CA (US)

(*) Notice: Subject to any disclaimer, the term of this patent is extended or adjusted under 35 U.S.C. 154(b) by 279 days.

(21) Appl. No.: 16/007,613

(22) Filed: Jun. 13, 2018

(65) Prior Publication Data
US 2018/0359814 A1 Dec. 13, 2018

Related U.S. Application Data

(60) Provisional application No. 62/518,860, filed on Jun. 13, 2017.

(51) Int. Cl.
| | |
|---|---|
| *H05B 3/42* | (2006.01) |
| *F24H 4/02* | (2006.01) |
| *A47J 36/24* | (2006.01) |
| *H05B 3/80* | (2006.01) |

(52) U.S. Cl.
CPC ............ *H05B 3/42* (2013.01); *A47J 36/2483* (2013.01); *F24H 4/02* (2013.01); *H05B 3/80* (2013.01)

(58) Field of Classification Search
CPC .............................. H05B 3/80; A47J 36/2483
USPC ................................................ 392/313, 448
See application file for complete search history.

(56) References Cited

U.S. PATENT DOCUMENTS

| 985,344 | A | * | 2/1911 | Harvie et al. ............ H05B 3/80 |
| | | | | 392/497 |
| 1,210,086 | A | * | 12/1916 | Leitch .................. H05B 3/0004 |
| | | | | 392/313 |
| 2,477,363 | A | * | 7/1949 | Danner ................. A01K 63/065 |
| | | | | 219/473 |
| 3,476,915 | A | | 11/1969 | Rapsis |
| 3,619,565 | A | * | 11/1971 | D'Elia ................. A01K 63/065 |
| | | | | 219/523 |
| 5,465,014 | A | * | 11/1995 | Avvisati ............... A01K 63/065 |
| | | | | 219/523 |
| 5,968,396 | A | | 10/1999 | Rodriguez |
| 9,215,948 | B2 | | 12/2015 | Fetterman et al. |
| 2011/0186283 | A1 | | 8/2011 | Preston |
| 2014/0369735 | A1 | * | 12/2014 | Candela ................. B43K 23/08 |
| | | | | 401/66 |
| 2015/0082996 | A1 | | 3/2015 | Wu |
| 2018/0310758 | A1 | * | 11/2018 | Gabbay .................. A47J 41/02 |

* cited by examiner

*Primary Examiner* — Ibrahime A Abraham
*Assistant Examiner* — John J Norton
(74) *Attorney, Agent, or Firm* — Argus Intellectual Enterprise; Jordan Sworen; Daniel Enea

(57) ABSTRACT

A portable food and beverage heating device including an elongated heating element designed to be immersed in a substance and to radiate heat to increase the temperature of the substance. The device further including a removable cap designed to act as an intermediary between a power supply and the elongated heating element, such that in one embodiment the heating element can only receive power from the power supply when the removable cap is secured to a second end of a housing. Additionally, the device includes several safety features like a non-conductive heat-resistant tip, a burn guard, a non-conductive fastener, and optional foldability or removability of the heating element all of which are designed to safeguard against personal injury to a user, or damage to a container holding the substance being heated.

18 Claims, 4 Drawing Sheets

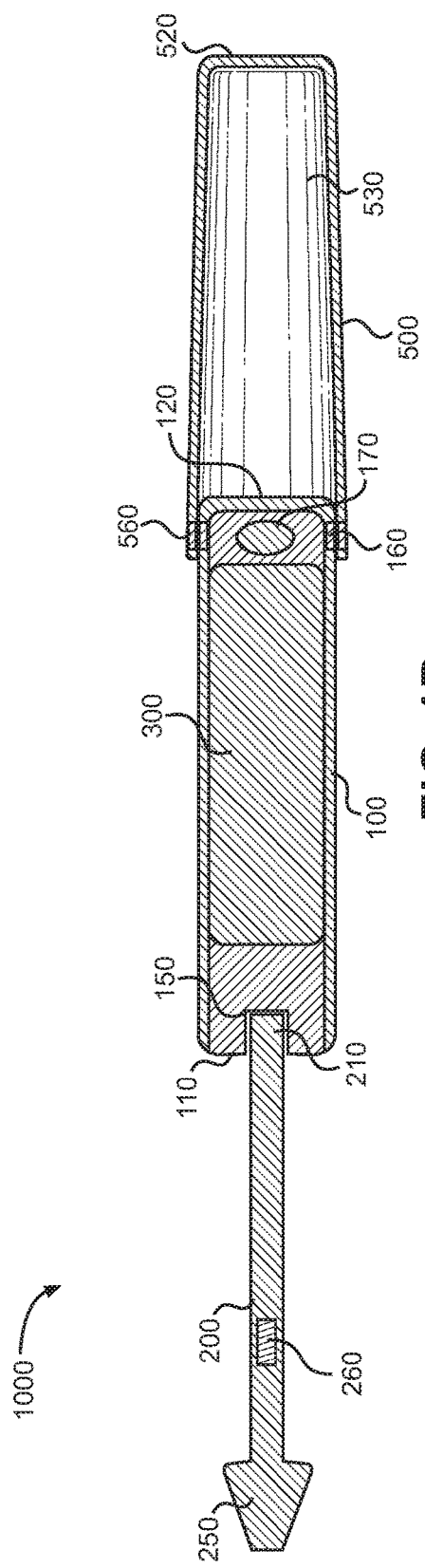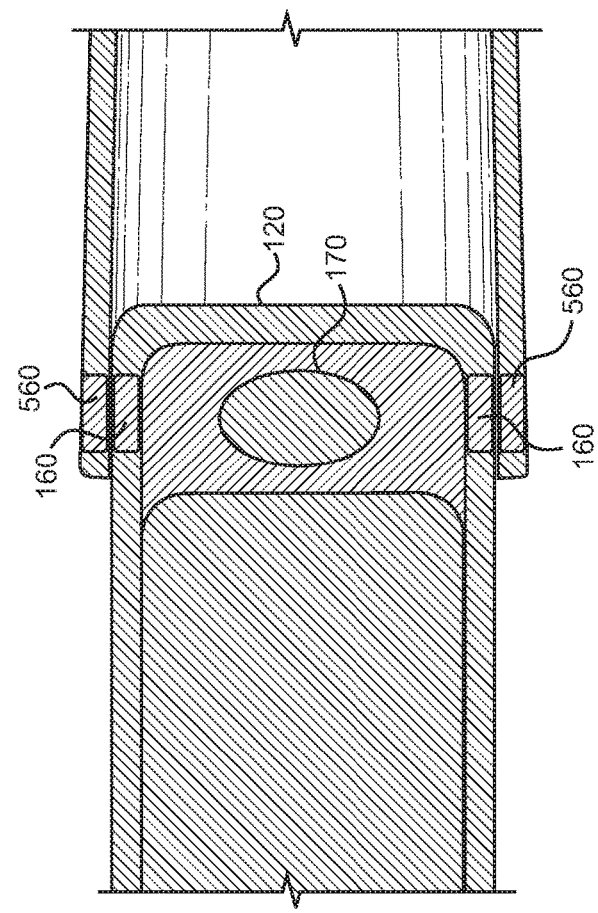
FIG. 1B
FIG. 1C

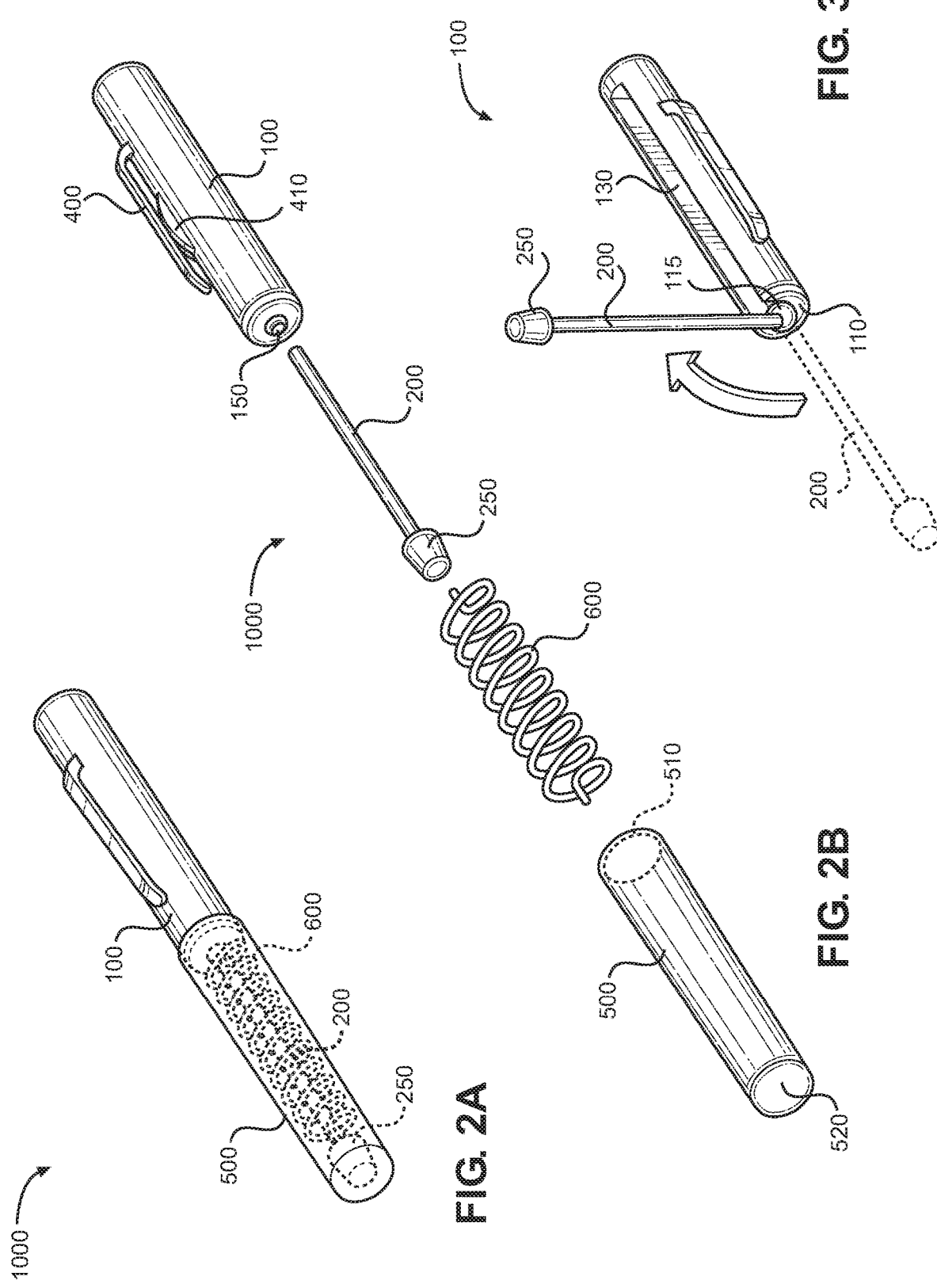

PORTABLE FOOD AND BEVERAGE HEATING DEVICE

CROSS REFERENCE TO RELATED APPLICATION

This application claims the benefit of U.S. Provisional Application No. 62/518,860 filed on Jun. 13, 2017. The above identified patent application is herein incorporated by reference in its entirety to provide continuity of disclosure.

BACKGROUND OF THE INVENTION

The present invention relates to the preparation of food and drink. More specifically, the present invention provides a portable device for heating food and beverages.

In order to provide the most enjoyable dining experience many types of foods and drink are intended to be served hot. However, if the food or beverage cools to an ambient temperature, the dining experience will be degraded. Most people will wish to reheat the food and drink items before consuming them, but reheating is not always an option. For example, if the individual is on the road in car, access to a microwave or stove is unlikely. Although some portable heating utensils are available many are required to be plugged in via a cord, which is not convenient if a power source is not readily available. This is especially inconvenient when camping or hiking, or even watching a sporting event at an outdoor venue. Additionally, an attached cord takes up space when not in use and can become a nuisance. Accordingly, a portable food and beverage device that is battery-operated and easily storable is desired.

Devices have been disclosed in the known art that relate to portable device for heating food and beverages. These include devices that have been patented and published in patent application publications. These devices generally relate to portable immersible heaters. However, these devices have several known drawbacks. For example, these known art devices do not include a means of safe guarding the container from being damaged by the heating element, or safe guarding the user from accidentally burning themselves on the heating element.

The present invention differs from the known art in that the present invention comprises a non-conductive tip affixed to the end of the heating element, or optionally includes a non-conductive heat-resistant burn guard coiled around the heating element. Additionally, the present invention differs from the known art in that the heating element is engaged by affixing the cap to the housing.

In light of the devices disclosed in the known art, it is submitted that the present invention substantially diverges in design elements from the known art and consequently it is clear that there is a need in the art for an improvement to existing portable device for heating food and beverages. In this regard the instant invention substantially fulfills these needs.

SUMMARY OF THE INVENTION

In view of the foregoing disadvantages inherent in the known types of portable devices for heating food and beverages now present in the known art, the present invention provides a new portable device for heating food and beverages wherein the same can be utilized for providing convenience for the user when reheating food or beverages when in an environment without readily accessible electrical power.

It is therefore an object of the present invention to provide a new and improved portable device for heating food and beverages that has all of the advantages of the known art and none of the disadvantages.

It is another object of the present invention to provide an elongated heating element configured to be immersed in a substance and to radiate heat to increase the temperature of the substance.

Another object of the present invention is to provide an elongated heating element disposed on a first end of a housing extending outward from the first end of the housing to a non-conductive heat-resistant tip.

Yet another object of the present invention is to provide a non-conductive heat-resistant tip configured to prevent the elongated heating element from coming into direct contact with the surface of a container holding the substance being heated.

A further object of the present invention to provide a power supply configured to power the elongated heating element disposed in a second end of the housing that is operably connected to the elongated heating element.

Another object of the present invention is to provide a removable cap having an open end, an open interior volume therein, and a closed end, configured to be securely attached to either the first end or the second end of the housing.

An additional object of the present invention is to provide a fastener disposed on the exterior of the housing configured to removably secure the housing to a container holding a substance, such that the elongated heating element is immersed in the substance.

Yet another object of the present invention is to provide a burn guard made from non-conductive heat resistant material coiled around the elongated heating element such that the burn guard protects a user from burning themselves on the elongated heating element, while leaving one or more openings for the elongated heating element to still be exposed to the substance being heated.

Yet still another object of an embodiment of the present invention is to provide a portable food and beverage heating device, wherein the removable cap is configured to be an intermediary between the power supply and the elongated heating element, such that the elongated heating element can only receive power from the power supply when the removable cap is secured to the second end of the housing.

Another object of the present invention is to provide a portable device for heating food and beverages that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1B shows a cross-sectional view along line 1B of an embodiment of a portable food and beverage heating device, with cap connected to the second end of the housing.

FIG. 1C shows a close-up view of the connection between the cap and the housing of an embodiment of a portable food and beverage heating device, with cap connected to the second end of the housing.

FIG. 2A shows a perspective view of an embodiment of a portable food and beverage heating device, with cap connected to the first end of the housing.

FIG. 2B shows a disassembled view of an embodiment of a portable food and beverage heating device.

FIG. 3 shows a perspective view of the housing and elongated heated element of an embodiment of a portable food and beverage heating device, where the elongated heating element is being folded toward a groove in the housing.

DETAILED DESCRIPTION OF THE INVENTION

Figure 1A:
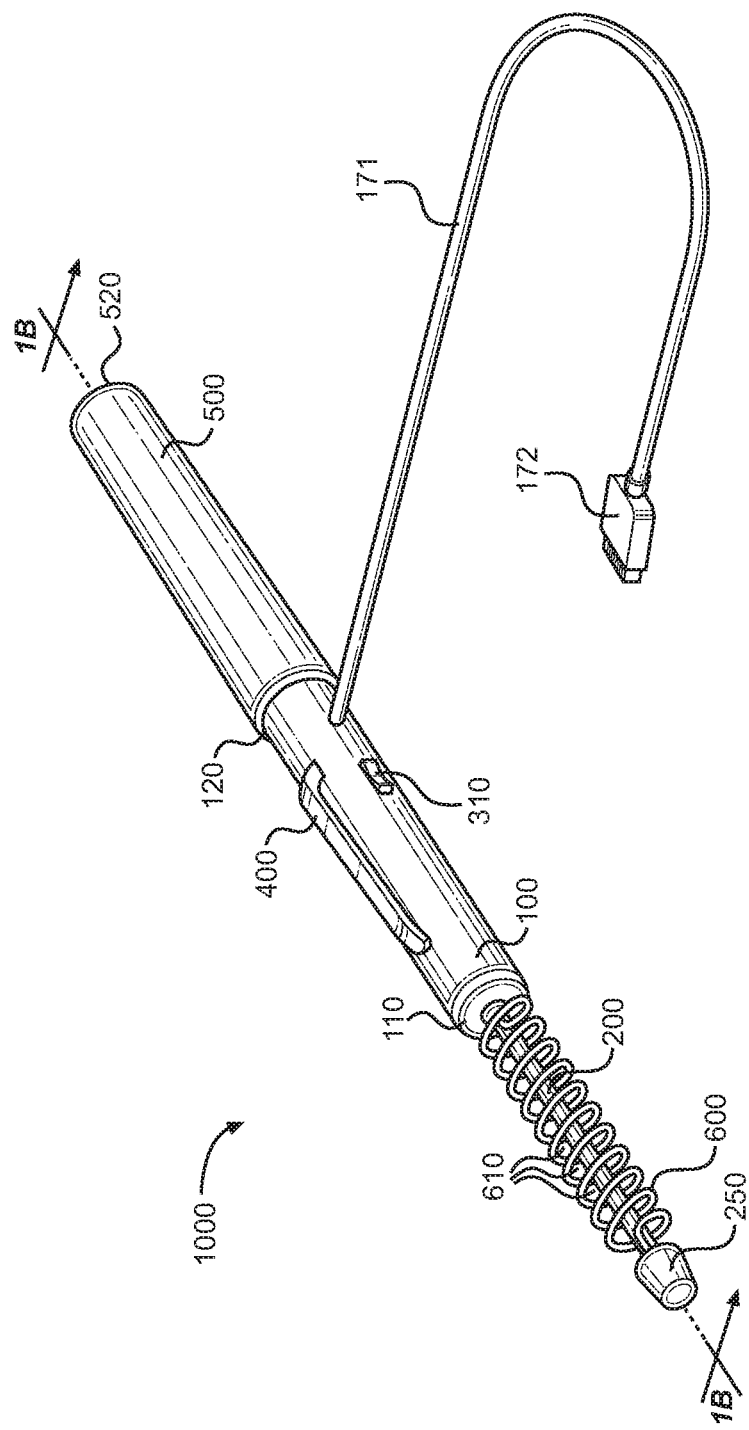
FIG. 1A shows a perspective view of an embodiment of a portable food and beverage heating device, with cap connected to the second end of the housing.

Reference is made herein to the attached drawings. Like reference numerals are used throughout the drawings to depict like or similar elements of the portable food and beverage heating device. For the purposes of presenting a brief and clear description of the present invention, the preferred embodiment will be discussed as used for a portable food and beverage heating device. The figures are intended for representative purposes only and should not be considered to be limiting in any respect.

Referring now to FIGS. 1A, 1B and 1C, there is shown a perspective view, a cross-sectional view along line 1B, and a close-up view of the connection between the cap and the housing of an embodiment of a portable food and beverage heating device, with cap connected to the second end of the housing, respectively. The portable food and beverage heating device 1000, comprises an elongated heating element 200 configured to be immersed in a substance and to radiate heat to increase the temperature of the substance such that the temperature increase provided by the elongated heating element 200 is proportional to the amount of direct exposure that the surface-area of the elongated heating element 200 has with the substance being heated.

In the illustrated embodiment the elongated heating element 200 is disposed on a first end 110 of a housing 100, such that the elongated heating element 200 extends outward from the first end 110 of the housing 100 to a non-conductive heat-resistant tip 250. More specifically, the first end 110 of the housing includes an aperture 150 configured to receive and removably secure a first end 210 of the elongated heating element 200, such that the elongated heated element 200 can be installed in the aperture 150 when needed for active use and uninstalled and stored away when the portable food and beverage heating device 1000 is inactive.

In one embodiment a power supply 300 is disposed in the housing 100 such that the power supply 300 is operably connected to the elongated heating element 200. Additionally, the power supply 300 is rechargeable via a charge port 170 configured to recharge the power supply 300 through a wired connection to an electrical outlet or power bank. In another embodiment (shown in FIG. 1A), an exterior wire 171 extends from the housing, wherein a port 172 disposed on a distal end thereof is configured to connect to an external power supply, such as a power bank. The exterior wire 171 is operably connected to the elongated heating element 200 and can serve as the primary power source or in alternate embodiments, the external wire 171 serves to power a power supply disposed within the housing, such as a battery.

In the illustrated embodiment, a removable cap 500 having an open end 510 (most clearly seen in FIG. 2B), an open interior volume 530 therein, and a closed end 520 is configured to be securely attached to either the first end 110 or the second end 120 of the housing 100. In the illustrated embodiment, the removable cap 500 is further configured to act as an intermediary connection between the power supply 300 and the elongated heating element 200, such that the elongated heating element 200 can only receive power from the power supply 300 secured to the second end 120 of the housing 100.

In this embodiment the removable cap 500 acting as intermediary is equivalent to a power switch for the elongated heating element 200. To create this power switch functionality a first sensor 160 is embedded in the outer surface of the housing 100 such that it forms a ring around the housing 100 while a second sensor 560 is similarly embedded along the inner surface of the removeable cap 500 such that it forms a ring around the removable cap 500. When the second end 120 of the housing 100 is inserted through the open first end 510 and into the open interior volume 530, the two sensors 160, 560 come into physical contact with one another to close the switch and allow the elongated heating element 200 to connect to the power supply 300. The power switch functionality of the removable cap 500 provides the added safety benefit of ensuring that the elongated heating element 200 can never continue to radiate heat and burn through the removable cap 500 when attached to the first end 110 of the housing 100. Thereby avoiding personal injury or damage to property due to accidentally powering on the portable food and beverage heating device 1000 when not in active use. In the illustrated embodiment, the elongated heating element 200 is alternatively activated by an on and off switch 310 positioned on the side of the housing.

In the illustrated embodiment, a temperature sensor 260 is disposed on the elongated heating element 200 and is configured to detect the temperature of the substance the elongated heating element is immersed in. The temperature sensor 260 is operably connected to the power supply such that when the temperature sensor 260 detects a threshold temperature the power supply is automatically turned off. The detection of a threshold temperature by the temperature sensor 260 is configured to prevent the substance from burning or the overcooking of food or vaporizing if the substance is a liquid, such as coffee, milk, hot chocolate, and the like. The automatic turn off further minimizes unnecessary use of energy from the power supply.

Referring now to FIGS. 2A and 2B, there are shown a perspective view of an embodiment of a portable food and beverage heating device, with cap connected to the first end of the housing, and a disassembled view of an embodiment of a portable food and beverage heating device, respectively.

In the illustrated embodiment the housing 100 and removable cap 500 portions of the portable food and beverage heating device 1000 are sized and proportioned to be in the form of a pen and a corresponding pen cover, respectively. Here, the open interior volume 530 of the removable cap 500 is shaped and proportioned to encapsulate the entirety of the elongated heating element 200 when attached to the first end 120 of the housing 100. This embodiment further includes a removable burn guard 600 made from non-conductive heat resistant material coiled around the elongated heating element such that the removable burn guard 600 protects a user from burning themselves on the elongated heating element 200, while leaving one or more openings 610 (most clearly seen in FIG. 1A) for the elongated heating element 200 to still be exposed to the substance being heated. Additionally, the elongated heating element 200 is removably attached to the first end 110 of the housing, such that when not in use the elongated heating element 200 can be detached, or when malfunctioning the elongated heating element 200 can be more easily replaced with a substitute part.

Figure 4:
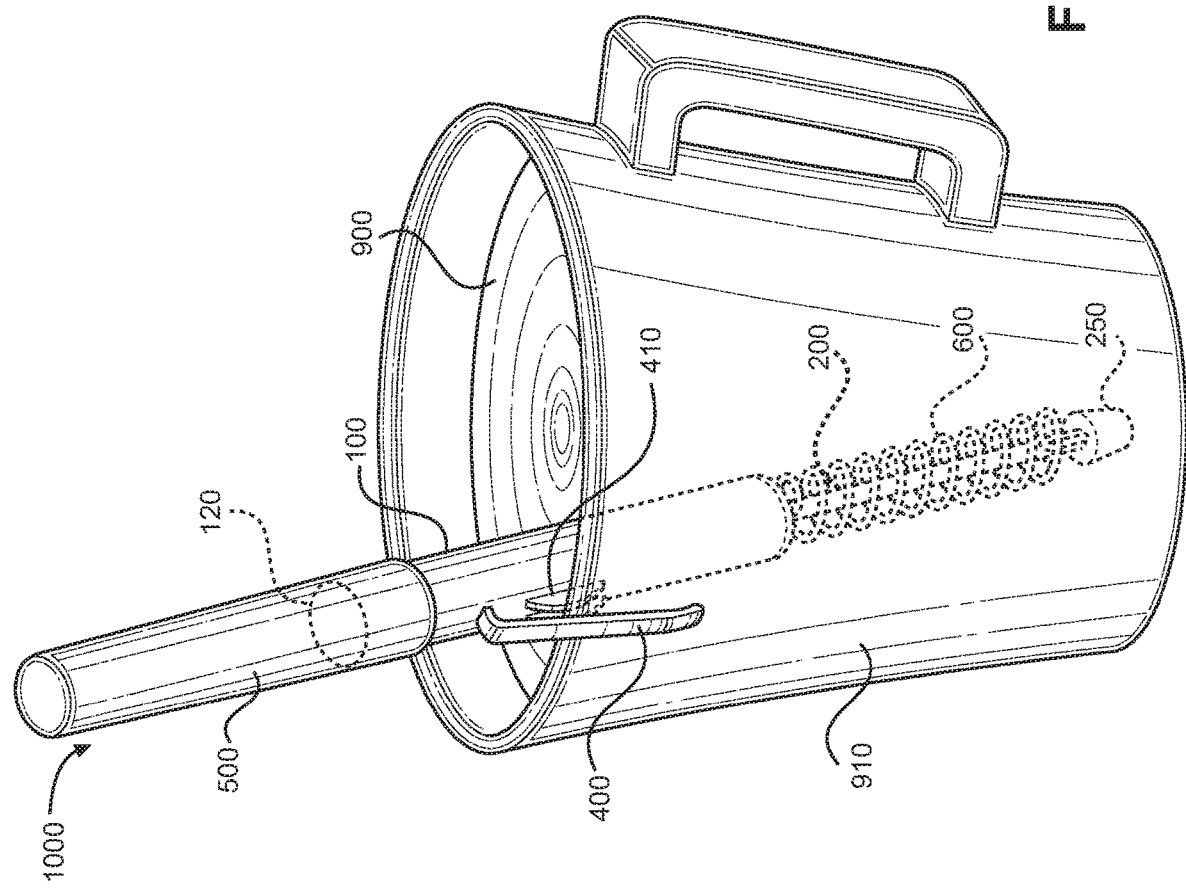
FIG. 4 shows a perspective view of an embodiment of a portable food and beverage heating device in use heating a beverage in a container.

In the illustrated embodiment of FIG. 2B, a protrusion 410 is disposed on an exterior of the housing 100, aligned with a fastener 400 extending from the housing 100. The protrusion 410 is configured to angle the portable food and beverage heating device away from a sidewall of a container towards center thereof, as seen in FIG. 4. In the illustrated embodiment, the protrusion 410 comprises a pair of curved portions. In alternate embodiments, the protrusion 410 is any shape suitable to angle the portable food and beverage heating device away from the sidewall of the container. In other embodiments the protrusion is affixed to the fastener and performs the same function. In this way, the heating process is more efficient as the heat is being generated from the center of the substance outward.

Referring now to FIG. 3, there is shown a perspective view of the housing and elongated heated element of an embodiment of a portable food and beverage heating device, where the elongated heating element is being folded toward a groove in the housing. In one embodiment a groove 130 is disposed on the outer surface of the housing 100 and is configured to receive the elongated heating element 200 therein. The elongated heating element 200 is hingedly connected to the first end 110 of the housing via a hinge 115, such that the elongated heating element 200 can be folded down into the groove 130 disposed on the outer surface of the housing 100. The foldability of the elongated heating element further enhances the portability of the overall device.

Furthermore, like the heat-resistant tip 250, the burn guard 600, and the removable cap 600, the foldable function provides an additional safeguard against personal injury or property damage due to radiation of the elongated heating element 200.

Referring now to FIG. 4, there is shown a perspective view of an embodiment of a portable food and beverage heating device in use heating a beverage in a container. The illustrated embodiment includes a fastener 400 disposed on the exterior of the housing 100 that is configured to removably secure the housing 100 to a container 910 holding a substance 900, such that the elongated heating element 200 is immersed in the substance 900 while the removable cap 500 is secured to the second end 120 of the housing 100. In one embodiment the fastener 400 is a clip made from non-conductive heat resistant material to ensure that heat generated by the elongated heating element does not transmit through the fastener 400 to burn or otherwise damage the container 910.

In the illustrated embodiment, in operation an exterior face of the protrusion 410, facing the fastener 400, applies force against the container such that the housing 100 and elongated heating element 200 are angled away from a side of the container and towards a center thereof. The elongated heating element 200 can be used in a folded, intermediate position, between an aligned position with the housing and the folded stored position, in order to extend further into the center of the container for more efficient heating. Similarly, the non-conductive heat-resistant tip 250 is configured to prevent the elongated heating element 100 from coming into direct contact with the surface of the container 910 holding the substance being heated.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable food and beverage heating device, comprising:
    an elongated heating element configured to be immersed in a substance and to radiate heat to increase the temperature of the substance is disposed on a first end of a housing, such that the elongated heating element extends outward from the first end of the housing to a non-conductive heat-resistant tip;
    wherein the non-conductive heat-resistant tip is configured to prevent the elongated heating element from coming into direct contact with the surface of a container holding the substance being heated;
    a power supply configured to power the elongated heating element is disposed in a second end of the housing and is operably connected to the elongated heating element;
    a fastener disposed on the exterior of the housing is configured to removably secure the housing to a container holding the substance, such that the elongated heating element is immersed in the substance;
    a removable cap having an open end, an open interior volume therein, and a closed end is configured to be securely attached to either the first end or the second end of the housing, such that the open interior volume of the removable cap is shaped and proportioned to encapsulate the elongated heating element when attached to the first end of the housing;
    wherein the removable cap is configured to be an intermediary link between the power supply and the elongated heating element, such that the elongated heating element can only receive power from the power supply when the removable cap is secured to the second end of the housing.

2. The portable food and beverage heating device of claim 1, wherein the temperature increase provided by the elongated heating element is proportional to the amount of direct exposure the surface area of the elongated heating element has with the substance being heated.

3. The portable food and beverage heating device of claim 2, wherein a burn guard made from non-conductive heat resistant material is coiled around the elongated heating element such that the burn guard protects a user from burning themselves on the elongated heating element, while leaving one or more openings for the elongated heating element to still be exposed to the substance being heated.

4. The portable food and beverage heating device of claim 1, wherein a groove disposed on outer surface of the housing is configured to receive the elongated heating element therein.

5. The portable food and beverage heating device of claim 1, wherein the elongated heating element is hingedly connected to the first end of the housing via a hinge, such that the elongated heating element can be folded down into a groove disposed on outer surface of the housing.

6. The portable food and beverage heating device of claim 1, wherein the elongated heating element is disposed between a folded position within the housing and a position linearly aligned with the housing, when immersed in the substance and radiating heat.

7. The portable food and beverage heating device of claim 1, wherein the elongated heating element is removably attached to the first end of the housing, such that when not in use the elongated heating element can be detached, or when malfunctioning the elongated heating element can be replaced.

8. The portable food and beverage heating device of claim 1, wherein the power supply is a battery and is rechargeable via an electrical outlet or a power bank.

9. The portable food and beverage heating device of claim 1, further comprising an exterior wire extending from the housing configured to operably connect to a secondary power supply.

10. The portable food and beverage heating device of claim 1, wherein the fastener is a clip made from non-conductive heat resistant material.

11. The portable food and beverage heating device of claim 1, wherein the housing and removable cap portions of the portable food and beverage heating device are sized and proportioned to be in the form of a pen and a corresponding pen cover, respectively.

12. The portable food and beverage heating device of claim 1, wherein the removable cap portion is sized and proportioned to encapsulate the entirety of the elongated heating element.

13. The portable food and beverage heating device of claim 1, further comprising a first sensor configured to detect a presence of a second sensor, wherein the first sensor is embedded in the outer surface of the housing such that it forms a ring around the second end of the housing.

14. The portable food and beverage heating device of claim 13, wherein the second sensor is configured to detect a presence of the first sensor, wherein the second sensor is embedded along the inner surface of the removeable cap such that it forms a ring around the open end of the removable cap.

15. The portable food and beverage heating device of claim 14, wherein the second end of the housing is inserted through the open first end and into the open interior volume, the first sensor and second sensor come into physical contact with one another to close a switch and allow the elongated heating element to connect to the power supply.

16. The portable food and beverage heating device of claim 1, further comprising a protrusion disposed on the housing configured to cause an angling of the housing when the fastener is attached to the container.

17. A portable food and beverage heating device, comprising:
an elongated heating element configured to be immersed in a substance and to radiate heat to increase the temperature of the substance is disposed on a first end of a housing, such that the elongated heating element extends outward from the first end of the housing to a non-conductive heat-resistant tip;
wherein the non-conductive heat-resistant tip is configured to prevent the elongated heating element from coming into direct contact with the surface of a container holding the substance being heated;
a power supply configured to power the elongated heating element is disposed in a second end of the housing and is operably connected to the elongated heating element;
a fastener disposed on the exterior of the housing is configured to removably secure the housing to a container holding the substance, such that the elongated heating element is immersed in the substance;
a removable cap having an open end, an open interior volume therein, and a closed end is configured to be securely attached to either the first end or the second end of the housing, such that the open interior volume of the removable cap is shaped and proportioned to encapsulate the elongated heating element when attached to the first end of the housing;
wherein a groove disposed on outer surface of the housing is configured to receive the elongated heating element therein.

18. A portable food and beverage heating device, comprising:
an elongated heating element configured to be immersed in a substance and to radiate heat to increase the temperature of the substance is disposed on a first end of a housing, such that the elongated heating element extends outward from the first end of the housing to a non-conductive heat-resistant tip;
wherein the non-conductive heat-resistant tip is configured to prevent the elongated heating element from coming into direct contact with the surface of a container holding the substance being heated;
a power supply configured to power the elongated heating element is disposed in a second end of the housing and is operably connected to the elongated heating element;
a fastener disposed on the exterior of the housing is configured to removably secure the housing to a container holding the substance, such that the elongated heating element is immersed in the substance;
a removable cap having an open end, an open interior volume therein, and a closed end is configured to be securely attached to either the first end or the second end of the housing, such that the open interior volume of the removable cap is shaped and proportioned to encapsulate the elongated heating element when attached to the first end of the housing;
wherein the elongated heating element is disposed between a folded position within the housing and a position linearly aligned with the housing, when immersed in the substance and radiating heat.

* * * * *